(12) United States Patent
Ladha et al.

(10) Patent No.: US 7,660,785 B1
(45) Date of Patent: Feb. 9, 2010

(54) TECHNIQUES FOR MANAGING INTERACTIONS BETWEEN APPLICATIONS AND A DATA STORE

(75) Inventors: Alnasir Ladha, Markham (CA);
Lorenzo Danesi, Richmond Hill (CA);
Sihua Luo, Toronto (CA)

(73) Assignee: Teradata US, Inc., Miamisburg, OH (US)

( * ) Notice: Subject to any disclaimer, the term of this patent is extended or adjusted under 35 U.S.C. 154(b) by 566 days.

(21) Appl. No.: 10/722,296

(22) Filed: Nov. 25, 2003

(51) Int. Cl.
*G06F 17/30* (2006.01)

(52) U.S. Cl. .............................. 707/3; 707/4
(58) Field of Classification Search ............... 707/1–10, 707/100–104.1, 200–205
See application file for complete search history.

(56) References Cited

U.S. PATENT DOCUMENTS

| | | | |
|---|---|---|---|
| 5,574,900 A | 11/1996 | Huang et al. | |
| 5,835,755 A | 11/1998 | Stellwagen, Jr. | |
| 5,862,325 A * | 1/1999 | Reed et al. | 709/201 |
| 5,873,075 A | 2/1999 | Cochrane et al. | |
| 5,973,666 A | 10/1999 | Challener et al. | |
| 6,009,265 A | 12/1999 | Huang et al. | |
| 6,021,405 A | 2/2000 | Celis et al. | |
| 6,023,772 A * | 2/2000 | Fleming | 714/13 |
| 6,081,854 A * | 6/2000 | Priem et al. | 710/37 |
| 6,125,413 A * | 9/2000 | Baruch et al. | 710/52 |
| 6,205,465 B1 | 3/2001 | Schoening et al. | |
| 6,208,990 B1 | 3/2001 | Suresh et al. | |
| 6,226,267 B1 * | 5/2001 | Spinney et al. | 370/235 |
| 6,453,313 B1 * | 9/2002 | Klein et al. | 707/3 |
| 6,505,200 B1 * | 1/2003 | Ims et al. | 707/8 |
| 6,507,834 B1 | 1/2003 | Kabra et al. | |
| 6,898,609 B2 * | 5/2005 | Kerwin | 707/203 |
| 6,901,482 B2 * | 5/2005 | Gruner et al. | 711/130 |
| 6,934,702 B2 * | 8/2005 | Faybishenko et al. | 707/3 |

* cited by examiner

*Primary Examiner*—Charles Rones
*Assistant Examiner*—Daniel Kuddus
(74) *Attorney, Agent, or Firm*—Schwegman, Lundberg & Woessner

(57) ABSTRACT

Methods, systems, and data stores are provided for managing interactions between applications and a data store. Threaded applications do not directly read from or write to the data store. An extract utility performs an initial query against the data store on behalf of multiple instances of the applications. The query results service the applications from an application queue. The applications produce application data from processing the query results. The application data is streamed to a load queue and streamed out of the load queue for purposes of creating a temporary table. The temporary table is then merged into an application table of the data store, once all instances of the applications finish processing.

6 Claims, 5 Drawing Sheets

TECHNIQUES FOR MANAGING INTERACTIONS BETWEEN APPLICATIONS AND A DATA STORE

FIELD OF THE INVENTION

The present invention relates to data processing and in particular to techniques for managing parallel processes interfacing with a data store.

BACKGROUND OF THE INVENTION

Organizations are increasingly capturing, indexing, analyzing, and updating voluminous amounts of data during the normal course of conducting their business. Accordingly, organizations now rely heavily on electronic data for purposes of managing, tracking, and forecasting their business. This data is often captured and stored in one or more data stores, such as databases, which may also sometimes be organized as a data warehouse.

A variety of software vendors provide applications (utilities or services) that assist organizations with more efficiently accessing their data within the data stores. Some applications offer improved access capabilities which can be processed in parallel. Applications such as these improve processing throughput for reading and writing large amounts of data from and to the data store. That is, these applications are threaded which means that multiple copies of these applications concurrently process against the data store. By doing this, operations complete more quickly which can be of vital importance when several gigabytes of data need to be processed against the data store.

However, as the number of threaded applications increase within a computing environment and concurrent access attempts are made by these applications for the data being managed by the data store, performance can degrade. This is so, because the data is centrally managed and controlled in order to keep it in proper synchronization. As a result, as the number of threaded write applications increase and attempt to concurrently update the data store, the performance of the data store degrades. Thus, parallel processing may not always improve performance and, in some instances with a proper processing state, may actually degrade performance.

As a consequence of this, many vendors or computing environments will include soft limits on the number of instances of threaded applications which can be instantiated and processed at any particular time. In other circumstances, the data store will include a hard limit that prevents it from communicating with more than N (some integer number greater than 0) instances of a threaded application.

Conventionally, data store applications have been threaded to improve interactions with a data store. However, these conventional threaded applications can actually degrade performance based on multiple simultaneous access attempts being made against the data store. Moreover, conventional threaded applications are often limited by hard or soft configurations which recognize there is a point of diminishing returns associated with an optimal number of treaded applications processing within a computing environment.

Therefore, there is a need for improved techniques that manage interactions between threaded applications and a data store.

SUMMARY OF THE INVENTION

In various embodiments of this invention techniques are provided for managing interactions between applications and a data store.

More specifically, and in one embodiment, a method for managing interactions between applications and a data store is presented. Data is currently extracted from a data store into a first queue, and a plurality of applications is concurrently serviced with portions of the data from the first queue. Moreover results data is currently loaded into a second queue, where the plurality of applications concurrently produces the results data. The results data is concurrently populated into a temporary table, and the temporary table is merged with a data store table of the data store.

In still another embodiment of the present invention, another method for managing interactions between applications and a data store is described. A query for a data store and an identifier for an application are received. The identifier is for an application that desires to process the results of the query and update the data store with application data. Next, multiple instances of an application associated with the identifier are concurrently initiated on multiple processing nodes. The query is currently processed and the results are housed in one or more application queues that reside on one or more of the processing nodes. Each of the instances of the application is concurrently serviced from the one or more application queues.

In another embodiment of the present invention, a data store application management system is provided. The data store application management system includes one or more application queues, one or more load queues, and a merge utility. The one or more application queues service one or more applications with results of a query to a data store. The one or more load queues house application data produced by the one or more applications, and the merge utility merges the application data into a data store table.

In yet another embodiment of the present invention, a data store residing in a computer-readable medium, is presented. The data store includes one or more temporary tables and an application table. The one or more temporary tables store application data produced from concurrently processing applications in response to concurrently provided query results extracted from the data store. The application data table houses application data once the applications have finished producing the application data and the one or more temporary tables are merged into the application data table.

Still other aspects of the present invention will become apparent to those skilled in the art from the following description of various embodiments. As will be realized the invention is capable of other embodiments, all without departing from the present invention. Accordingly, the drawings and descriptions are illustrative in nature and not intended to be restrictive.

DETAILED DESCRIPTION OF THE INVENTION

In the following description, reference is made to the accompanying drawings that form a part hereof, and in which is shown by way of illustration specific embodiments in which the invention may be practiced. These embodiments are described in sufficient detail to enable one of ordinary skill in the art to practice the invention, and it is to be understood that other embodiments may be utilized and that structural, logical, optical, and electrical changes may be made without departing from the scope of the present invention. The following description is, therefore, not to be taken in a limited sense, and the scope of the present invention is defined by the appended claims and their equivalents.

As used herein an "application" refers to any service, system, interface, or utility that directly or indirectly interfaces with a data store. Furthermore, an application as used herein is threaded, which means that multiple instances of the application can be processed in parallel. Thus, an instance of the application is event based and capable of sharing its resources with other instances of the application. Threaded applications are well-known by one of ordinary skill in the art, and techniques are readily available for making an application threaded. The application can be any conventionally available application or an application custom-developed for the teachings of this invention.

A data store can be a single database, a plurality of databases interfaced together, a combination of databases and directories, a combination of databases and electronic files, or a data warehouse.

A database can be relational or object oriented. In one embodiment, the data store is a Teradata warehouse distributed by NCR Corporation of Dayton, Ohio.

Figure 1:
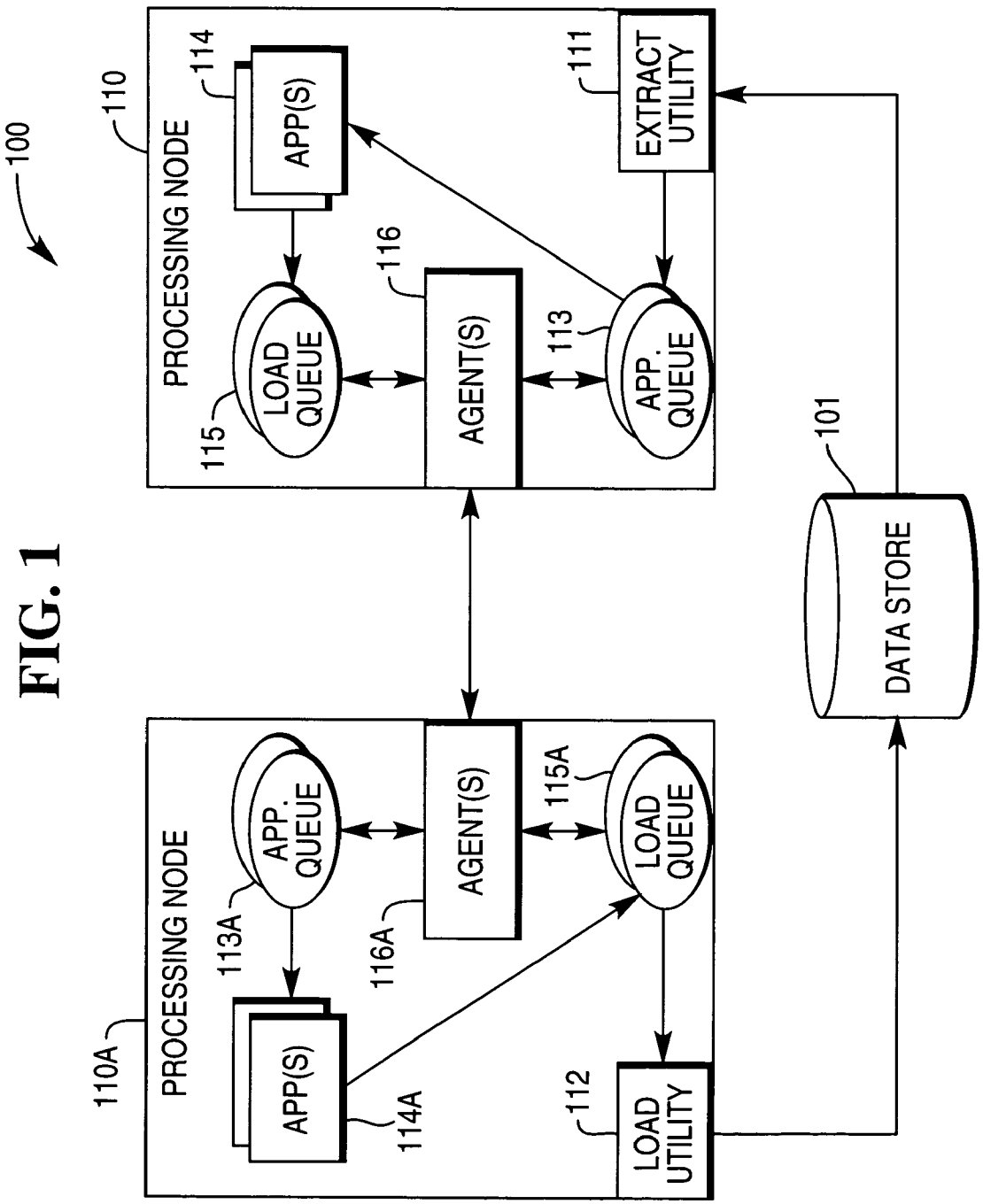
FIG. 1 depicts a diagram representing an architecture for managing interactions between applications and a data store.

FIG. 1 is a diagram representing an architecture 100 for managing interactions between applications 114 and 114A and a data store 101. The architecture 100 is implemented in a computer-readable or accessible medium and is available over a network. The network can be hardwired, wireless, or a combination of hardwired and wireless.

The architecture 100 includes a first processing node 110 and a second processing node 110A. Each processing node 110 and 110A include a variety of architectural components. Each of these components is software instructions and electronic data structures which are accessible and capable of processing on their respective processing nodes 110 or 110A.

The first processing node 110 includes an extract utility 111, one or more application queues 113, one or more applications 114, one or more load queues 115, and one or more agents 116. The extract utility 111 executes a query against the data store to acquire query results. As the query results are received, the results are streamed or piped directly into the application queues 113. The results are concurrently consumed by the applications 114 from the application queues 113 and concurrently processed to produce application data. The application data, as it is produced, is streamed or piped into the load queues 115. The agents 116 keep the application queues 113 and the load queues 115 in synchronization with the application queues 113A and the load queues 115A of the second processing node 110A.

Similarly, the second processing node 110A includes an application queue 113A, one or more applications 114A, a load queue 115A, and one or more agents 116A. Additionally, the second processing node 110A includes a load utility 112. The load utility acquires application data produced by the applications 114A and populates one or more temporary tables in the data store 101. The agents 116A communicate with the agents 116 to keep the application queues 113A and the load queues 115A in synchronization with the application queues 113 and the load queues 115 of the first processing node 110.

It is important to note that the processing being performed by each of the components does not need to wait on each of the remaining components to finish processing before initiating. That is, each component streams its results to and from the queues (113, 113A, 115, and 115A) and consumes data from the queues (113, 113A, 115, and 115A) when needed. Moreover, it is noted that the configuration depicted in FIG. 1 is presented for purposes of illustration only. A variety of other configurations are possible without departing from the teachings presented herein. For example, each processing node 110 and 110A can include both an extract utility 111 and a load utility 115. Alternatively, in some embodiments, there is only a single processing node 110 or 110A. The configuration of FIG. 1 is presented from purposes of explanation and ease of comprehension and is not intended to limit the present invention.

As an example of how the architecture 100 can improve conventional interactions between applications 114 and 114A consider the following example scenario. An organization desires to perform forecasting on its business operations. The forecasting application is threaded, such that a plurality of the forecasting operations can be simultaneously processing. Before the forecasting application processes it requires a search query to execute against the data store 101 in order to acquire business transactional data needed for purposes of generating the business forecast. The transactional data can span several years' worth of data and is most likely extremely voluminous.

Continuing with the present example, initially, a business analyst accesses an interface to identify the search query and the desired forecasting application. The interface can also be designed to take certain configuration information from the business analyst or can include pre-installed configuration information. The configuration information can identify the available processing nodes 110 and 110A. Moreover, the configuration information can identify an architectural limit associated with a total number of concurrent instances of the applications 114 and 114A which can be processing within the architecture 100 at any given point in time. The configuration information can also include the location of the components within each of the processing nodes 110 and 110A and the number of components to be instantiated within each of the processing nodes 110 and 110A.

Again, continuing with the example, the interface includes a event driven driver that initiates the components of the architecture 100 in accordance with the configuration data. As soon as the extract utility 111 is initiated and receives the search query, the extract utility 111 begins to execute the query against the data store 101 to acquire the search query results. As results are received they are placed in the application queue(s) 113. As soon as data begins to appear in the application queue(s) 113, the application(s) 114 extract the data and begin performing their forecasting computations based thereon. As soon as application data is produced from the application(s) 114, the application data is placed in the load queue(s) 115. During this process and concurrent thereto, the agent(s) 116 of the first processing node 110 communicates changes to the queues 113 and 115 to the agent(s) 116A of the second processing node 110A.

Thus, as the example continues, the instances of the forecasting application 114A processing on the second processing node 110A also consumes data from the application queue(s) 113A and streams application data directly to load queue(s) 115A. The agent(s) 116A communicate with agent(s) 116 to communicate load queue(s) changes. As application data begins to appear in the load queue 115 and 115A, the load utility 112 extracts the application data out and populates one or more temporary tables in the data store 101.

The example processing of the architecture 100 continues until each instance of the applications 114 and 114A finishes processing. At this point, the one or more temporary tables are merged within the data store 101 into a permanent data store table. That final table represents the combined results attributed to the processing of all the instances of the applications 114 and 114A.

It is noted that the architecture and the example processing discussed above provides improved interactions between applications 114 and 114A and a data store 101. This is achieved because, rather than having each individual instance of the applications 114 and 114A directly contact the data store 101 for purposes of executing a query and updating processing data, access is managed and controlled by an extract utility 111, a load utility 112, one or more application queues 113, and one or more load queues 115. These utilities and data structures are uniquely arranged and interfaced so that parallel processing can process efficiently without interruption and without unduly taxing and competing for limited and controlled access to the data store 101. Conventionally, each of the instances of the applications would individually compete and directly access the data store 101, and under these circumstances performance was degraded because access to the data store is centrally managed and controlled, this is especially true for updates (write operations).

Figure 2:
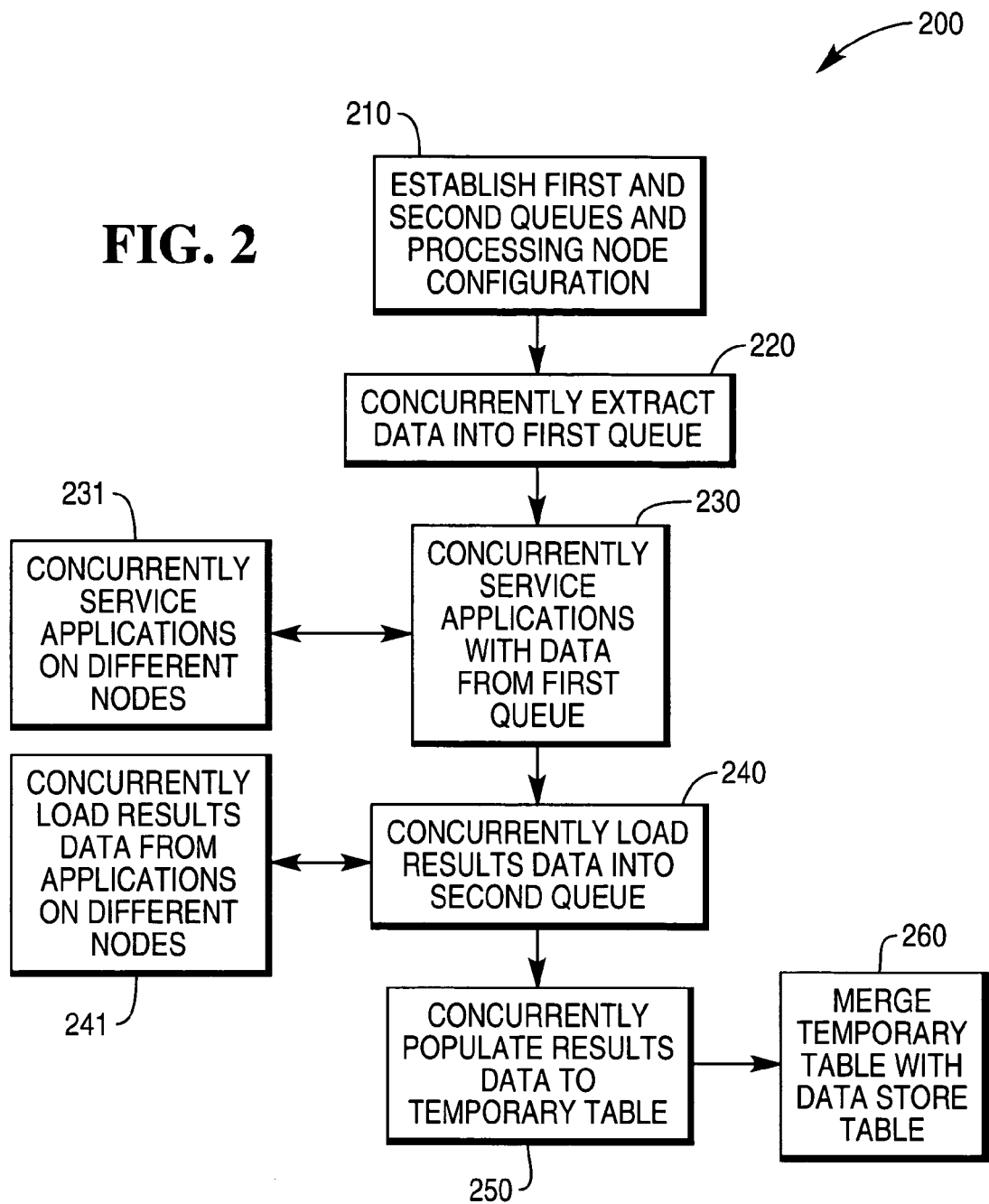
FIG. 2 depicts a flowchart of a method for managing interactions between applications and a data store.

FIG. 2 is a flow chart of one method 200 for managing interactions between applications and a data store. The method 200 is implemented in a computer-readable or accessible medium. In one embodiment, the method 200 is implemented as a series of utilities and data structures that cooperate with one another across a plurality of processing nodes within a network. Pieces of the processing embodied in method 200 can be implemented into interfaces provided to business analysts, as wrappers to treaded applications, and/or as intermediate interfaces between threaded applications and a data store.

In one embodiment, at 210, the processing of the method 200 communicates with an interface of a business analyst that desires to execute a threaded application in a computing environment. The purpose of the communication is to acquire directly or indirectly, by default, configuration data, which permits the processing of the method 200 to instantiate multiple first or second queues on a single or multiple processing nodes.

Additionally, a search query is received from a business analyst or user via an end-user interface. The search query includes search operands and search operators for acquiring search results from a data store. Conventionally, each instance of the threaded application, which the business analyst desires to process, would independently and unnecessarily issue the search query on to the data store. This created redundant data in memory and storage and unnecessarily taxed the data store with multiple and redundant search query requests.

Conversely, with the teachings of this invention, at 220, the search query is concurrently performed a single time on behalf of all instances of the threaded applications and the search results are housed in and streamed into a first queue. Concurrent to the executing the search query, the search results are used to service each of the applications from the first queue at 230.

In some embodiments, at 231, some applications and/or first queues can be processing on different processing nodes. That is, one instance of the threaded application that desires the search results can process on a first processing node, while another instance of the application processes on a second processing node. The first queue can be singularly located on the first processing node, or the first queue can be duplicated and available on both the first and second processing nodes. In cases where the first queue is duplicated on multiple processing nodes, a first queue agent can be installed on each processing node for purposes of keeping the contents of the duplicative first queues in synchronization with one another.

Concurrent to the processing of 220-230, the applications process the query results and produce their own results data, which is concurrently loaded into a second queue at 240. It is important to note that the processing of 220-240 all occurs simultaneously. That is, as data is extracted into the first queue it is immediately available to service the applications, and as the applications process that data the results are immediately streamed to the second queue.

In one embodiment, at 241, and similar to the processing of 231 above, the second queue can reside on a single processing node and be used to service multiple instances of the application, where some of the applications reside on the first processing node and some of the applications reside on different processing nodes. Moreover, in some embodiments, the second queue can be duplicated on a single processing node or across multiple processing nodes. In instances, where multiple second queues are present across a plurality of processing nodes, agents on each of the processing nodes can be used to keep the second queues in synchronization with one another.

In various embodiments discussed above where agents are used to keep multiple queues in synchronization with one another, the agents can use socket-based communications over Transmission Control Protocol/Internet Protocol (TCP/IP). These agents can also be used for all inter-node communications, such as when a single queue resides on one processing node and is used to service an instance of the application on another processing node.

At 250 concurrent to the processing of 220-240, the results data produced by the applications are acquired from the second queue(s) and populated to a temporary table. In some embodiments, the results data is populated to a plurality of temporary tables. Once the processing of all the application instances have finished, the temporary table(s) are merged with a data store table at 260.

In some embodiments, the applications are threaded and instantiated on multiple processing nodes. On each processing node, the processing of 220-250 occurs and the queues are synchronized with inter-node agents. Once all instances of the threaded applications complete processing, the processing at 260 takes place. In this manner, the data store is not continually accessed by the applications and continually updated by the applications; rather access is controlled and minimized to processing steps 220 and 260. This frees the data store up to service other requests and more efficiency utilizes the data store when access is requested at 220 and 260.

Figure 3:
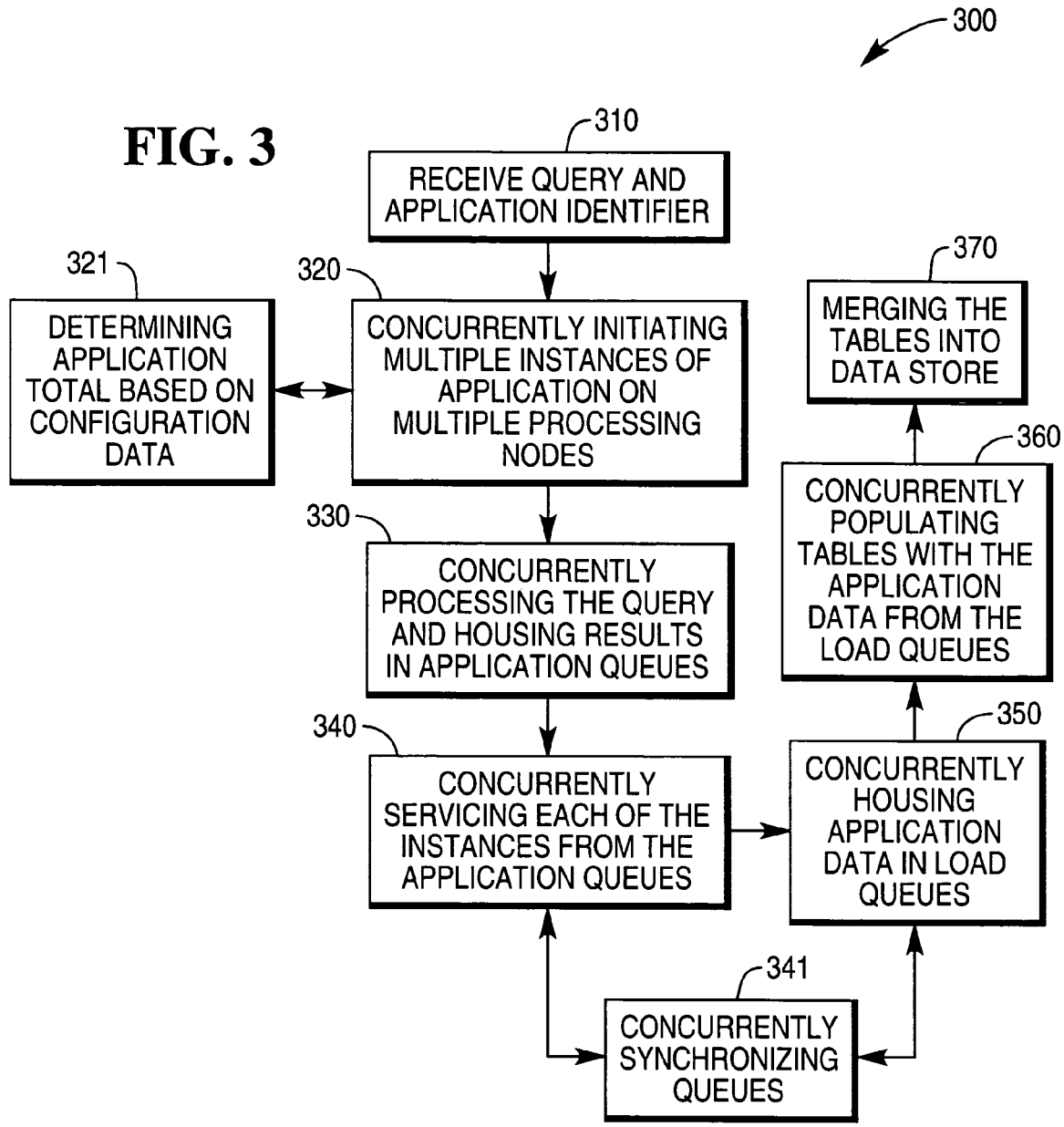
FIG. 3 depicts a flowchart of another method for managing interactions between applications and a data store.

FIG. 3 is a flowchart of another method 300 for managing interactions between applications and a data store. The method 300 is implemented in a computer-readable or accessible medium. Moreover, in one embodiment, the method 300 is implemented as a wrapper to a main instance of an application and communicates with and manages itself as multiple instances of the wrapper are processed with multiple instances of the application.

At 310 the processing of the method 300 receives a query and an application identifier that needs the query results to process and produce application data. The query and the application identifier are received through an end-user interface and provided by a business analyst or user. The application identifier serves to identify a threaded application, which can be initiated as multiple instances to process different portions of the query results. These application instances are designed to retrieve the query results from an application queue and store application data produced in a load queue.

At 320, based on configuration data supplied by a business analyst or available as a default through a business-analyst interface, a selective number of instances of the application are initiated on a selective number of multiple processing nodes. Thus, in one embodiment, at 321, the total number of application instances and their corresponding processing locations can be determined based on configuration data. This configuration data can also instruct to the processing of the method 300 to instantiate a defined number of application queues, load queues, extract utilities, and load utilities.

At 330, as soon as a first extract utility is initiated, the extract utility is passed a pointer to an appropriate application queue and the original received search query. Once the first extract utility is initialized, it begins querying the data store with the search query and begins to receive query results related to that search query. These query results are streamed or piped directly into the application queue to which the first extract utility points or writes to. All instances of the applications that point to this application queue can be concurrently serviced from this application queue as the first extract utility writes to the application queue. Moreover, any additional extract utilities can use agents to acquire and populate their application queues with the query results being acquired by the first instantiated extracted utility.

As has been previously discussed, there can exist a plurality of application queues, there can be multiple application queues residing on the same processing node, and there can be multiple application queues residing on different processing nodes. Corresponding, queue agents actively manage the queues and keep them in synchronization with one another, such that as one application queue is updated with query results the remaining application queues are likewise updated.

Therefore, at 330, the original search query is concurrently processed and the query results are concurrently housed in one or more application queues. Moreover, at 340, and concurrent to 330, each of the application instances are concurrently serviced from each of the application queues with the query results. The queues are synchronized with one another on a dynamic and continual basis at 341 by using event raising techniques and/or inter-node agents.

Concurrent to the processing of 320-340, the instances of the applications are extracting the query results from the application queues and processing that data to produce application data. Thus, at 350, the application data is concurrently housed in and streamed into one or more load queues. Again, in a manner similar to the application queues, if multiple load queues are present, then each of these load queues are synchronized with one another on a dynamic and continual basis at 341.

As the load queues are filled, the application data is concurrently extracted there from at 360 and used to populate one or more temporary tables. Once each instance of the applications finishes processing, the one or more temporary tables are merged at 370 into the data store.

Embodiments of the method 300 permit threaded applications to more efficiently interact with a data store in a networked environment. This is achieved by implementing one or more extract utilities and one or more load utilities. The extract utilities interface on the front-end to the data store by processing a needed query and streaming the query results to an application queue. The load utilities interface on the back-end to the data store by populating temporary tables with the application data produced by instances of the applications when processing the query results. Multiple instances of the queues can exist and are kept in synchronization with one another by queue agents. Additionally, the implementations of the extract and load utilities can be threaded in such a manner that they manage themselves and communicate with other instances of themselves.

Figure 4:
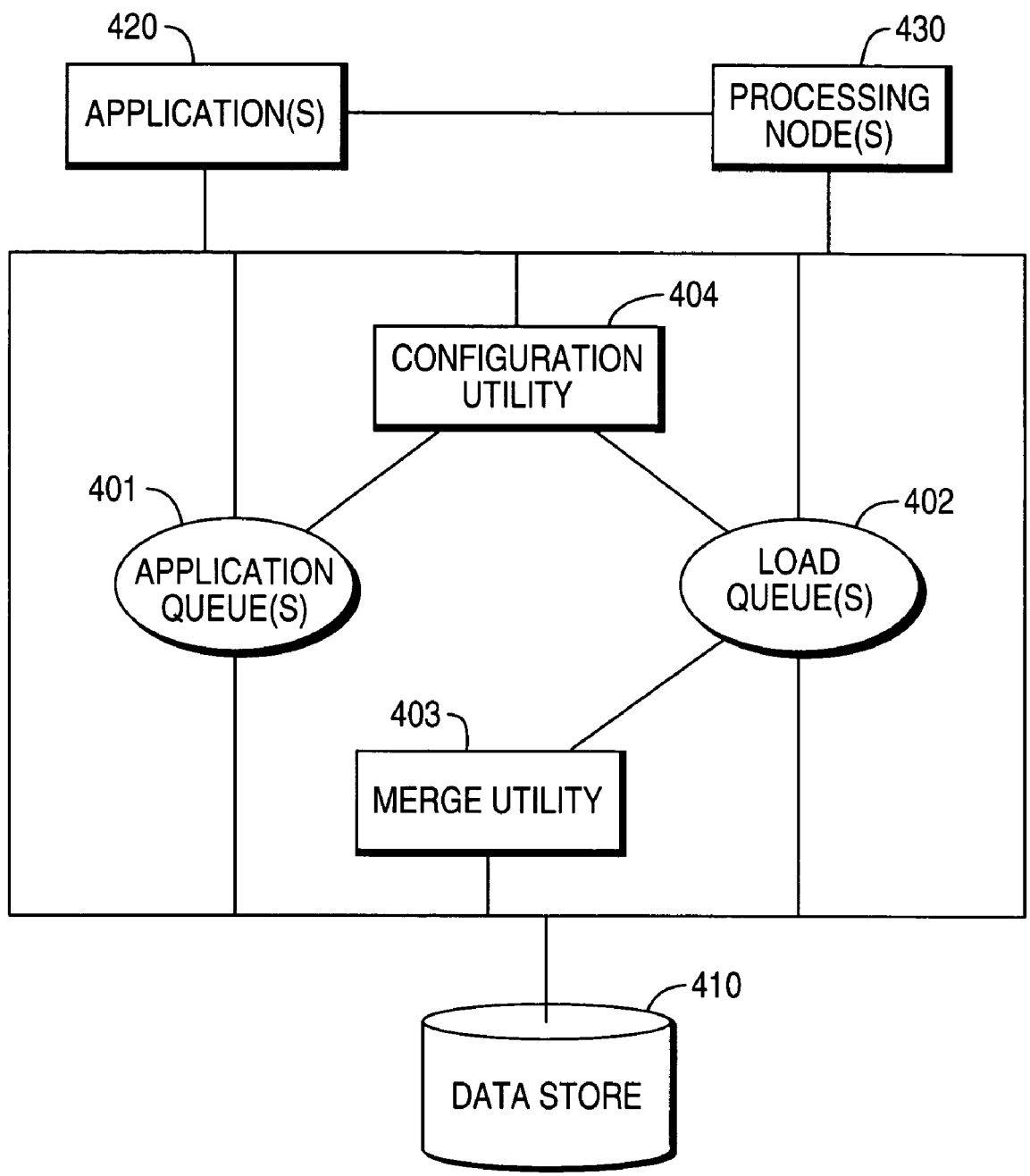
FIG. 4 depicts a diagram of a data store application management system.

FIG. 4 is a diagram of one data store application management system 400. The data store application management system 400 is implemented in a computer-readable or accessible medium. The system 400 is implemented as one or more software applications and electronic data structures that cooperate with one another in the manners described below.

The data store application management system 400 includes one or more application queues 401, one or more load queues 402, and a merge utility 403. Optionally, the data store application management system 400 also includes a configuration utility 403, one or more extract utilities (not shown in FIG. 4) and/or one or more load utilities (not shown in FIG. 4).

The system 400 serves as an interface between a data store 410 and an application 420. The application 420 is threaded, which means that multiple instances of the application 420 can be concurrently processing without causing conflict or delay. In this way, the multiple instances of the application 420 serve to process and solve a problem by each instance of the application 420 handling and addressing a different independent piece of the problem being solved.

In one embodiment, the configuration utility 404 initially receives an identifier that identifies the threaded application 420, a search query, and other configuration data. The other configuration data instructs the configuration utility 404 on how many instances of the applications 420 to initiate and on which processing nodes 430. Moreover, the configuration data instructs the configuration utility 404 on how many and where to create and start any extraction utilities, load utilities, application queues 401, and/or load queues 402.

Each of the instances of the applications 420 is serviced with query results data from one of the application queues 401. The application queues 401 receive the query results from an extraction utility that performs the query needed by each instance of the applications 420. Multiple application queues 401 are kept in synchronization with one another by queue agents designed to detect changes and stream changes and additions to the queues on all the remaining queues, regardless as to whether some queues reside on different processing nodes 430.

Each of the instances of the applications 420 process the query results to produce application data. The application data is streamed from each instance of the applications 420 to one of the load queues 402. The application data of the load queues 402 is streamed out of the load queues 402 and consumed by the merge utility 403.

In one embodiment, the application data is streamed out of the load queues 402 by one or more load utilities. The load utilities populate temporary tables and the merge utility 403 merges the temporary tables into a data store table of the data store 410. In other embodiments, the merge utility 403 waits for the instances of the applications 420 to finish processing and then streams the application data from the load queues 402 and populates the application data into a data store table in the data store 410.

The application and load queues 401 and 402 are concurrently updated and read from as the instances of the applications 420 process. The queues 401 and 402 provide a technique for servicing multiple instances of the applications 420 without each individual instance of the applications 420 requiring direct access to the data store 410. Thus, the data store 410 access is more controlled and better managed than what has been conventionally achieved.

Figure 5:
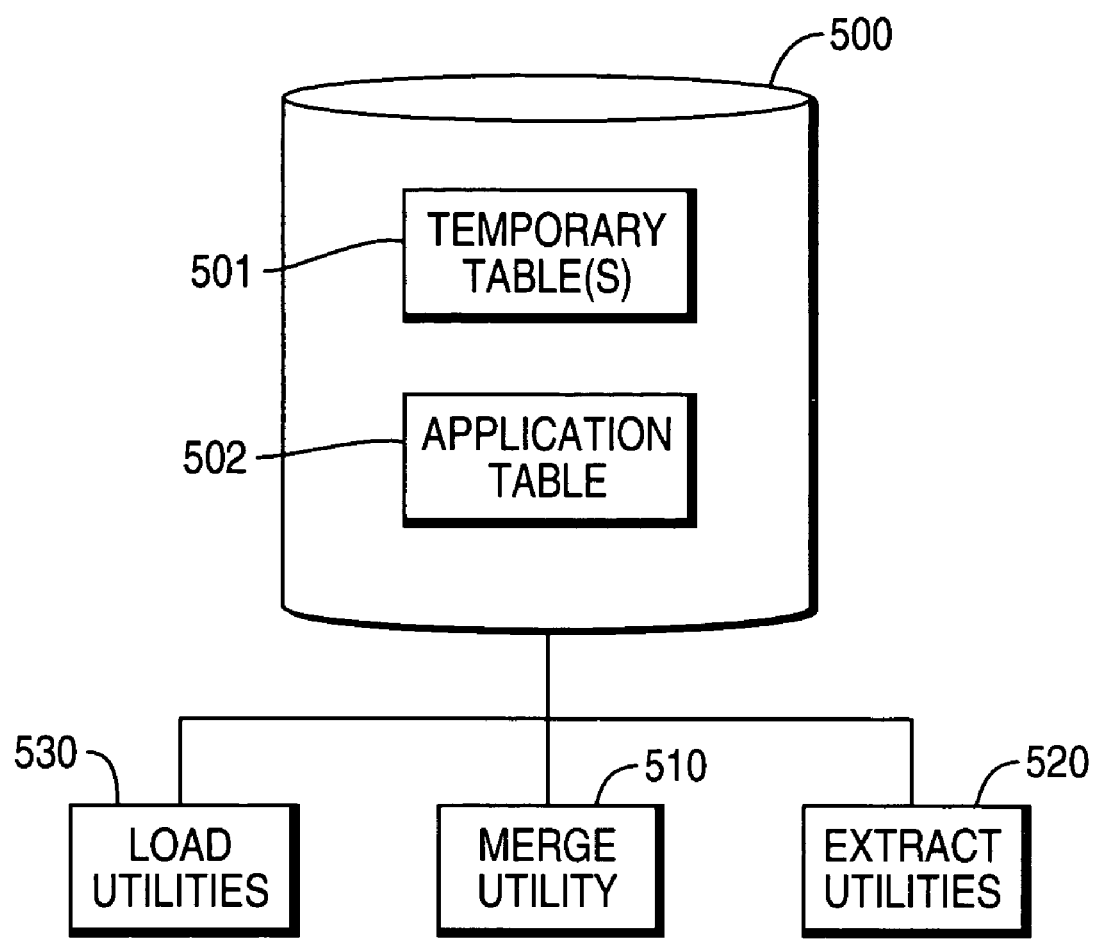
FIG. 5 depicts a block diagram data store used for managing interactions between applications and the data store.

FIG. 5 is a block diagram of one data store 500 used for managing interactions between applications and the data store 500. The data store 500 is implemented in a computer-readable or accessible medium. In one embodiment the data store 500 is a plurality of databases interfaced together. Alternatively, the data store 500 is a combination of databases, directories, or electronic files. The data store 500 can also be a data warehouse, such as the Teradata warehouse distributed by NCR Corporation of Dayton, Ohio.

The data store 500 includes one or more temporary tables 501 and an application table 502. The temporary tables 501 house application data produced by threaded instances of an application which concurrently process. The application data is produced by the application instances in response to query results received from the data store 500 in response to a previously issued query.

One or more extraction utilities 520 directly access the data store 500 for purposes of acquiring the query results and storing the results in one or more application queues. The application instances access the application queues to acquire the query results without directly contacting the data store for the query results.

As the application instances produce the application data in response to the query results acquired from the application queues, the application instances stream the application data into load queues. The application data housed in the load queues are streamed out of the load queues by one or more load utilities 530 and used to populate the temporary tables 501.

After each of the application instances finishes processing the query results and the load utilities 530 have populated the one or more temporary tables, a merge utility 510 merges the contents of the one or more temporary tables 501 into an application table 502. The application data can now be accessed and consumed from the data store 500 via the application table 502.

The above description is intended to be illustrative, and not restrictive. Many other embodiments will be apparent to those of skill in the art upon reviewing the above description. The scope of embodiments of the invention should, therefore, be determined with reference to the appended claims, along with the full scope of equivalents to which such claims are entitled.

The Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Description of the Embodiments, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

What is claimed is:

1. A computer-implemented method to manage interactions between applications and a data store and to process on a computer to perform the method, comprising:

receiving a query for a data store and an identifier for an application, the application while executing seeks to process results returned from and produced by executing the query and seeks to update the data store with application data, the application data is produced by the application processing the results of the query;

concurrently executing multiple instances of the application associated with the identifier on multiple processing nodes within a network to achieve parallel processing for the multiple instances of the application;

concurrently processing the query to acquire the results on behalf of the multiple instances of the application;

producing the results that are then streamed to a plurality of application queues residing on a plurality of the processing nodes as the results are acquired, each application queue having different portions of the results;

concurrently providing one of the different portions of the results to a particular one of the instances of the application from the application queues so that the instances processing the particular different portions of the results cooperates to produce all of the application data from the results;

streaming the results to load queues for a single update to the data store with all the application data, which is to be subsequently accessed from the data store;

updating the data store after each instance of the applications finishes processing and has completely streamed all application data to the load queues;

concurrently housing the application data in one or more load queues residing on one or more of the processing nodes; and concurrently populating one or more tables residing on the processing nodes with the application data from the one or more load queues.

2. The method of claim 1 further comprising merging the one or more tables into the data store.

3. The method of claim 1 wherein the currently initiating further includes determining a total number of the applications to initiate based on configuration data.

4. The method of claim 3 wherein the currently initiating further includes determining which of a number of the applications that are to be initiated on which of a number of the processing nodes based on the configuration data.

5. The method of claim 1 further comprising concurrently synchronizing the application queues and the load queues on the multiple processing nodes when at least some of the processing nodes lack one of the application queues or one of one or more load queues.

6. The solution template system of claim 5 wherein the concurrently synchronizing further includes establishing socket based communications between the multiple processing nodes with a Transmission Control Protocol/Internet Protocol (TCP/IP).

* * * * *